(No Model.)
A. O. WALKER.
PROCESS OF DEPOSITING SOLID PARTICLES SUSPENDED IN AIR OR GAS.
No. 342,548. Patented May 25, 1886.
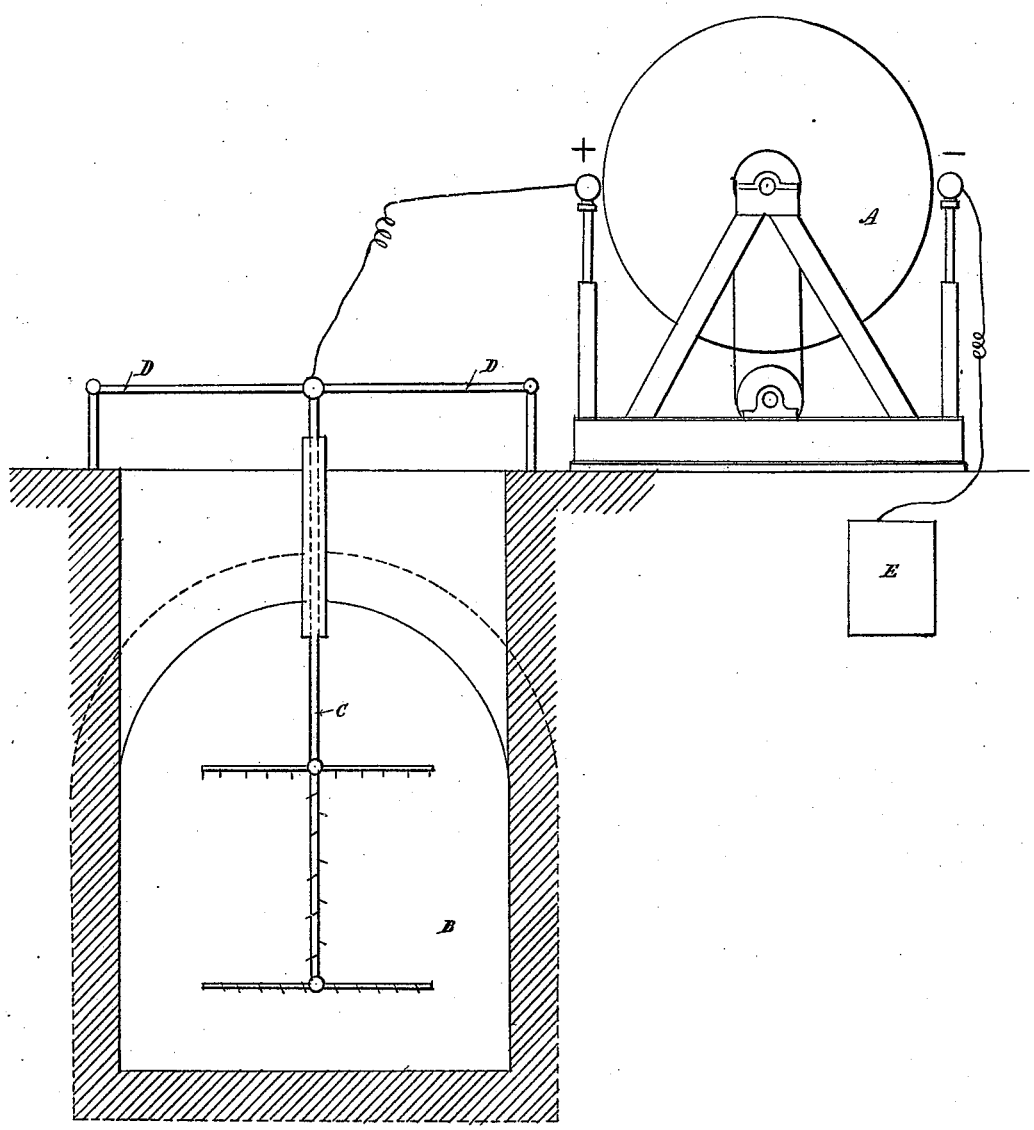

UNITED STATES PATENT OFFICE.

ALFRED OSTEN WALKER, OF THE LEADWORKS, CHESTER, ENGLAND.

PROCESS OF DEPOSITING SOLID PARTICLES SUSPENDED IN AIR OR GAS.

SPECIFICATION forming part of Letters Patent No. 342,548, dated May 25, 1886.

Application filed July 15, 1885. Serial No. 171,714. (No model.) Patented in England August 9, 1884, No. 11,120; in Germany February 27, 1885, No. 32,861; in Italy March 31, 1885, No. 18,007; in Belgium May 19, 1885, No. 68,927, and in Spain July 10, 1885, No. 7,211.

*To all whom it may concern:*

Be it known that I, ALFRED OSTEN WALKER, of the Leadworks, Chester, England, a subject of the Queen of Great Britain, have invented a Process of Depositing Solid Particles Suspended in Air or Gas—such as particles of metal or of metallic compounds—applicable for condensing fumes from smelting-furnaces and for other purposes; and I do hereby declare that the following is a full, clear, and exact description of the invention, which will enable others skilled in the art to which it appertains to make and use the same.

Letters Patent have heretofore been granted to me in Great Britain, No. 11,120, dated August 9, 1884; in Belgium, No. 68,927, dated May 19, 1885; in Spain, No. 7,211, dated July 10, 1885; in Germany, No. 32,861, dated February 27, 1885, and in Italy, No. 18,007, dated March 31, 1885.

This invention has for its object a process for causing suspended particles to aggregate together and to deposit collecting particles of metal or metallic compounds, and it is applicable for condensing fumes from smelting-furnaces, and for other purposes.

In smelting metals it occurs that metals or metallic compounds pass in a finely-divided state into flues or passages by which currents of air and gases are conveyed away from furnaces or apparatus in which metallic ore or matter is treated. I lead these fumes into any convenient receptacle or chamber or through any convenient flue or passage of suitable shape and length, and there, to separate the fine solid matter from the air in which it is suspended, I cause these fine particles to cohere and collect by means of a discharge of high potential electricity from metal points or edges or other projections situate in the flue, passage, chamber, or other receptacle, and so placed that the current of air or gas containing the finely-divided material or metallic vapor is carried or passes in close proximity to the discharging-points. The discharge from the points electrifies the air or gas, and the charged air or gas then acts on the finely-divided matter in it, causing it to cohere, condense, and deposit.

I will proceed to describe more in detail the way in which I prefer to apply my invention to the separation and collection of metalliferous particles from the fume from lead-smelting furnaces.

The annexed drawing illustates the arrangement of the apparatus.

A is an electrical machine.

+ and − are the poles of the machine. One of them is connected to earth and the other to conductors within the flue or chamber B.

C is an insulated conductor. It is studded with points, as indicated.

D D are insulating-supports.

The flues from such furnaces are at present frequently conducted for long distances in a horizontal or inclined direction, in order that the fume may deposit a portion of the metalliferous matter which it contains.

I can apply my process to the treatment of the fume as it passes in such flues, and the flues may be much shorter than at present, and nevertheless a better deposit will be obtained, and may apply the process in other receptacles or reservoirs. At each point where the treatment is to be applied I provide within the flue or chamber a metal conductor, which may be a rod or combination of rods, spheres, plates, or any other convenient form, of such dimensions as will be most suitable to the size of the passage or receptacle. At present I prefer two rods in the form of a cross, each arm of which occupies, respectively, about two-thirds of the height and breadth of the passage. I stud the surface of this conductor all over with metal points or other projections, at distances of two or three inches apart, and projecting, it may be, two or three inches from the surface of the metal conductor. I very carefully insulate this conductor in any suitable manner. Thus it may be done by supporting it at the end of a horizontal metallic rod passing through the wall of the flue. An earthenware tube may be inserted into the wall of the flue, and the supporting-rod may be passed through the tube, but without being in contact with it. Outside the flue the rod may be carried on glass legs, entering without contact at the neck into glass vessels in which a small quantity of strong sulphuric acid is contained.

This rod is connected with one terminal of any kind of electrical machine capable of developing high-tension electricity by induction or by friction, the other terminal being connected to the outside of the flue or chamber or to earth; or the electricity may be supplied at high potential by any other known means. The whole is so arranged that a continuous electric discharge is maintained from the points which stud the surface of the conductor within the flue or chamber into the air. Other means may be resorted to to insulate in like manner the sphere or conductor. Several of these arrangements may be applied along the flue at distances of a few yards. The metalliferous particles will by this treatment be caused to agglomerate, and will be deposited in the portion of the flue beyond and near the place or places where they are submitted to the electric discharge, as herein described.

The deposit may be removed mechanically from the flue from time to time, or it may be removed in part by a stream of water flowing along the lower part of the flue, as is the practice at present in flues for condensing lead-fume, or in any other convenient way.

Having now particularly described and ascertained the nature of my said invention and in what manner the same is to be performed, I declare that what I claim is—

The process for separating and collecting by means of electrical aggregation and deposition of finely-divided solid matter suspended in air or gas—such as particles of metal or metallic compounds—consisting in causing the fume or the current of air or gas carrying such finely-divided matter to be subjected to a discharge of electricity from an insulated conductor or conductors situate in the flue, passage, chamber, or receptacle through or into which the fume or current of air or gas passes, substantially as described.

ALFRED OSTEN WALKER.

Witnesses:
   THOS. ARTHUR FLETCHER,
      *Notary Public, Chester.*
   WILLIAM ARTHUR JONES,
      *Writing Clerk,* 10 *Chichester Street, Chester.*